United States Patent
Caulier et al.

[15] 3,646,343
[45] Feb. 29, 1972

[54] METHOD AND APPARATUS FOR MONITORING HOT BOXES

[72] Inventors: Paul W. Caulier, Greenwood; Donald W. Greene, Fishersville, both of Va.

[73] Assignee: General Electric Company

[22] Filed: Feb. 26, 1970

[21] Appl. No.: 14,574

[52] U.S. Cl. .................................246/169 D, 73/341
[51] Int. Cl. .................................B61l 3/06, B61k 9/06
[58] Field of Search.............246/169 D; 340/213 Q; 73/341

[56] References Cited

UNITED STATES PATENTS

| | | | |
|---|---|---|---|
| 3,101,617 | 8/1963 | Brinson | 73/341 |
| 3,226,540 | 12/1965 | De Priest | 246/169 D |
| 3,120,758 | 2/1964 | Craddock et al. | 73/341 |
| 3,177,359 | 4/1965 | Bramer et al. | 246/169 D |

Primary Examiner—Arthur L. La Point
Assistant Examiner—George H. Libman
Attorney—Michael Masnik, Frank L. Neuhauser, Oscar B. Waddell and Joseph B. Forman

[57] ABSTRACT

The temperatures of a plurality of journal bearings or boxes on a passing car are monitored. An average temperature value for each side of the passing car is derived. Comparisons are then effected between the temperatures of the individual journal boxes disposed on a given side of the car and the derived average temperature value for the given side, and deviations above or below predetermined limits are utilized to signify the presence of an alarm condition.

Also, means is disclosed by which the presence of an alarm condition can be correlated to a particular car and wheel of the passing train. This information is then enunciated to the train crew so that defective conditions can be readily corrected.

20 Claims, 7 Drawing Figures

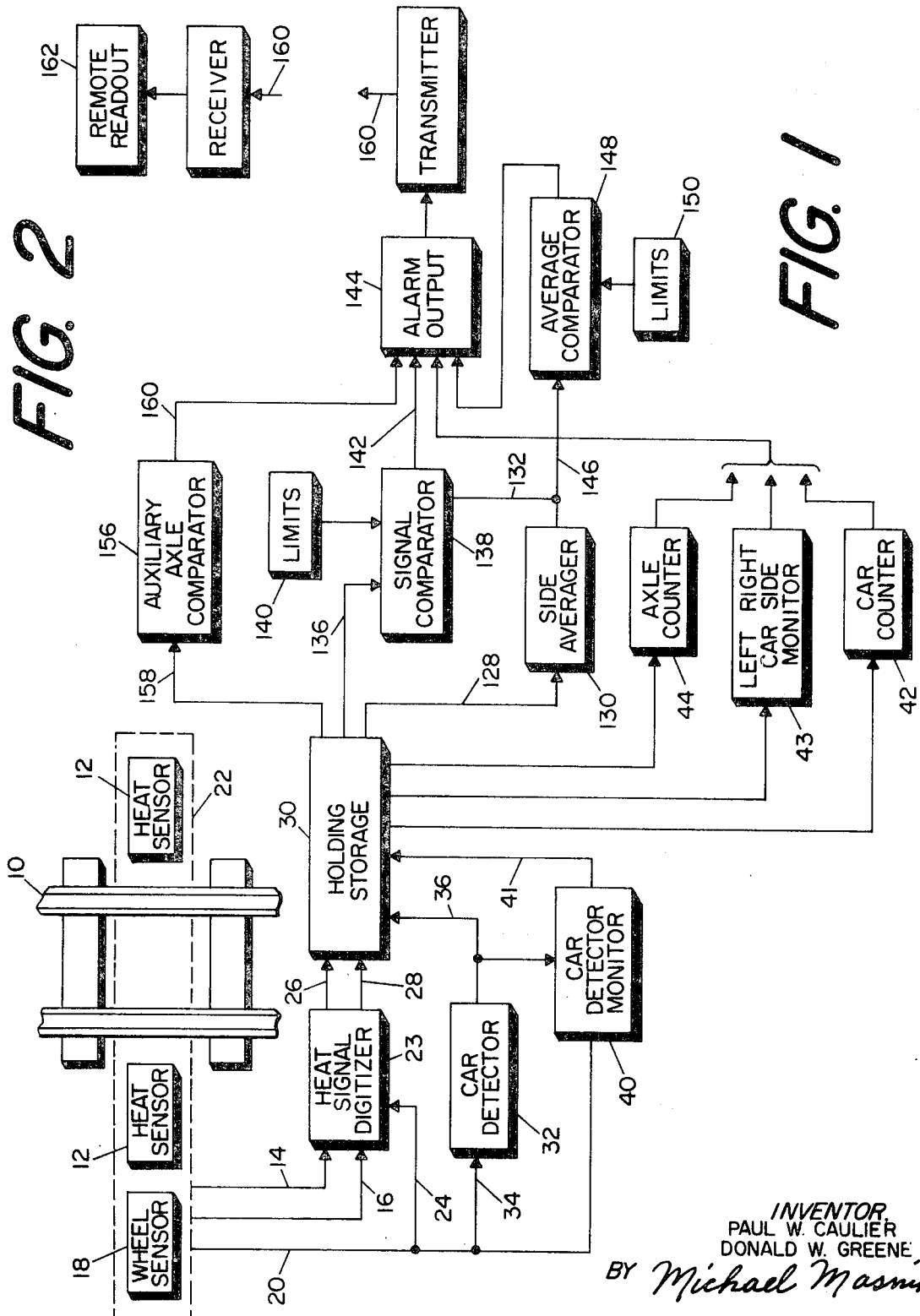

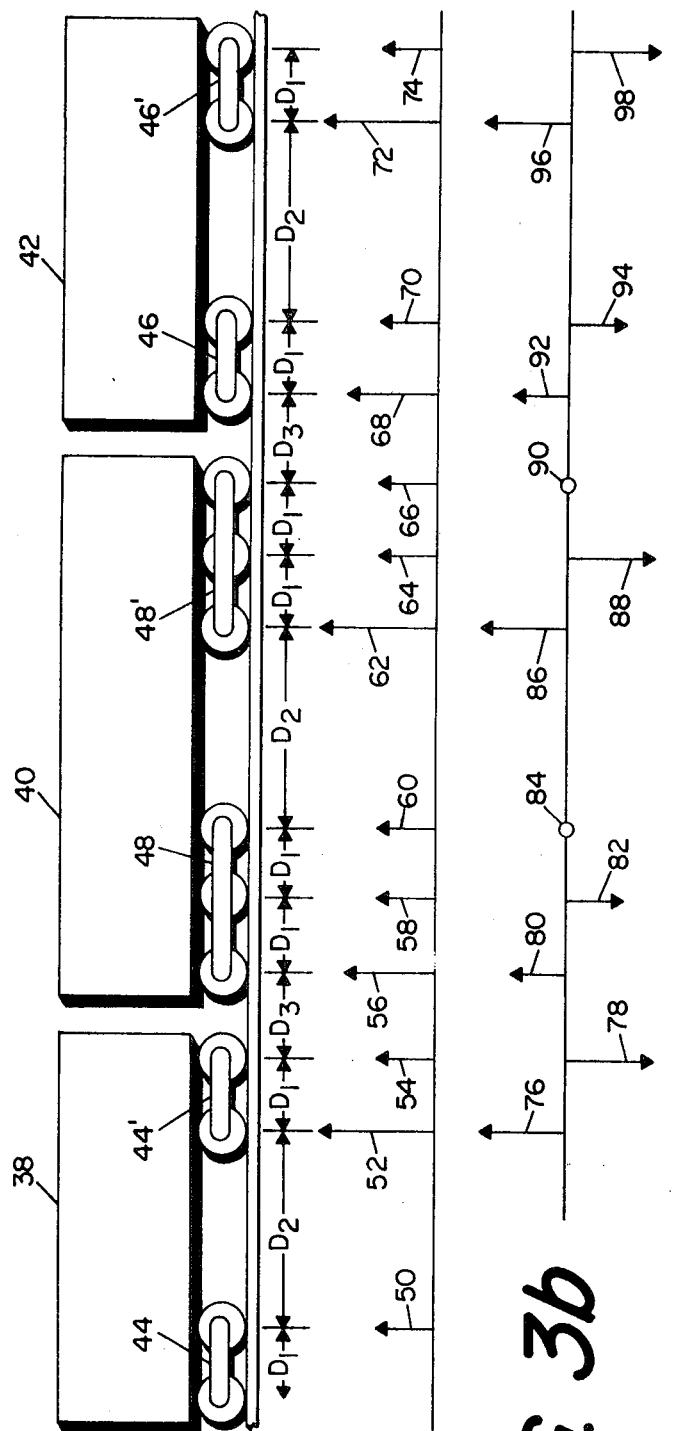

METHOD AND APPARATUS FOR MONITORING HOT BOXES

BACKGROUND OF THE INVENTION

This invention generally relates to temperature sensing systems and techniques and particularly concerns a novel method and apparatus for detecting hot journal bearings, i.e., hot boxes, on a passing railroad train.

The railroad industry has long been concerned with the detection and prompt repair of overheated journal bearings, i.e., hot boxes, on the cars of a passing train. Notwithstanding regular preventive maintenance, such hot boxes do indeed occur particularly on long hauls and at high-train speeds. Since it is not economically feasible to periodically stop the train enroute to a destination so as to manually check the temperatures of all the various journal bearings, the railroad industry has turned to automated, mechanized devices to achieve this end.

In this respect, technological advances, particularly as concerns the sensitivity of heat radiation detectors, have made possible the provision of "automatic" hot box detectors, i.e., detectors which are operable to sense defect conditions in a manner which does not necessitate a preliminary stopping of the train. Typically, such hot box detectors are disposed along both sides of a railroad track and, as a train passes by the track site, these detectors serve to measure the temperature of the various journal boxes on each car. The measured temperature data is then evaluated, occasionally by a human operator, and any alarm condition is enunciated to the train crew.

The use of these typical hot box detectors, however, does not wholly eliminate the problem of monitoring journal boxes for overheating as such hot box detectors exhibit manyfold disadvantages. Poor alarm criteria oftentimes are utilized primarily for purposes of economy. Human error arises in interpreting the monitored results. Additionally, such detectors oftentimes cannot accurately sense the temperatures of the passing journal boxes and the overall systems are not capable of efficiently and reliably presenting hot box information to train personnel.

Typically, hot box detectors comprise a heat sensor such as thermocouple or thermocell disposed at a track site along both sides of the rail. Such detectors have a sighting axis which intersects the passing journal boxes such that the heat generated therein can be monitored. Ideally, each sensor would serve to detect only the heat actually generated by the individual passing journal box. Yet, this ideal simply cannot be achieved in practice regardless of the alignment of the sighting axis. Accordingly, spurious and extraneous heat sources oftentimes interfere with the monitoring and reading of the actual journal box heat radiation. Extraneous heat sources such as coupling cylinders, brakeshoes, and the like create "false" signals.

Furthermore, since modern rolling stock includes cars which contain not only plain bearings but also roller bearings, and since roller bearings run at a hotter temperature than plain bearings, track site detector units may mistakenly indicate the presence of a hot box when a roller bearing journal passes by, the detector unit having no way of distinguishing the normally hotter roller bearing from a plain bearing. Other factors also serve to influence both the accuracy and sensitivity of typical prior art hot box detectors, these factors including but by no means being limited to the heating effect of the sun on the side of a car, the cooling effect of the wind, the heating due to loading, the heat loss due to the truck side frame, to the drive wind, and the like.

In addition to the above-mentioned extraneous sources or losses of heat, other factors leading to error in the detection of hot box conditions frequently arise in prior art hot box systems, such factors including variations and changes in the adjustment of the sighting axis of the sensor unit, the attenuation of the optical sighting path, its actual amplification, gain, its frequency response and the like.

As should be apparent, although the provision of hot box detectors of the type in use today certainly goes a long way toward satisfying the critical monitoring need of the railroad industry, such prior art systems certainly are not adequate with respect to accuracy and reliability of detecting overheated journal boxes. If false alarm conditions are generated by such systems, a great waste of time and money is the result. Yet, if the detector system fails to register an actual alarm, then permanent damage to the journal bearings or whole train can result necessitating replacement or at least expensive repair.

Recognizing these basic deficiencies and inadequacies in actually detecting the presence of a hot box, the art has attempted to raise the level of accuracy and reliability of such detector systems and has turned to automated techniques wherein the outputs of the hot box heat sensors disposed to either side of the track or rail are compared one with the other, utilizing a differencing or ratio technique. For example, the temperature of the journal boxes on each side of a single axle has been measured and the difference between these two measurements taken. If the difference exceeded a particular value, then an alarm was triggered. Alternatively, rather than taking the difference between the measurements of the journal boxes to either side of a single axle, the ratio of such monitored temperatures might be taken instead. If the ratio exceeded a certain predetermined level, an alarm would be triggered. These techniques have proved to be somewhat effective in eliminating the generation of false alarm signals caused by a "misinterpretation" of a roller bearing for a plain bearing, for example, this improvement being rested on the theory that the same type of bearings would be provided to either side of the same axle.

By using such improved techniques, the ambient or environmental temperature conditions about the entire traveling railroad car have little or no effect on alarm indications. Even more sophisticated hot box detector systems utilize, in addition, a "gating" technique essentially operative in a manner such that the sensing devices are actuated only when a wheel of a car passes. In this fashion, many spurious or extraneous heat signals are eliminated. However, all such improvements made to prior art hot box detector systems have not satisfied the stringent detection requirements in this field and, even the most improved prior art systems inherently give false or misleading readings as a result of car side dependent variables such as sun heating, load heating, heat loss due to winds, and changes in the relative position between the passing journal boxes and the detector.

Even assuming that the presence of an alarm condition has been accurately detected and reliably evaluated, such alarm condition must still be correlated to a particular car and wheel. The typical prior art system, however, is largely inadequate in this respect as such systems normally are operative only to indicate the number or "count" of the axle from either the front or the rear of the train at which a hot box exists. Thus, once an alarm condition is detected and the axle information given to the train crew, the train must be stopped and the train crew must walk to the car at which the hot box exists, counting axles along the way from either the front or the rear of the train. Since a manual counting of axles must actually be effected in many of the prior art techniques, counting errors are easily possible and thus the overall adequacy of the hot box detecting systems is markedly reduced.

In summary then, the prior art techniques are deemed deficient as concerns the actual detection of an alarm condition, the interpretation of the alarm data, and further as concerns actual identification of the defective car.

SUMMARY OF THE INVENTION

A need thus exists in the art for an improved method and apparatus for detecting hot journal boxes which effectively eliminates the aforesaid disadvantages of the prior art. It is the primary object of the instant invention to provide such a method and apparatus which satisfies this need.

Further, more specific, yet equally important objects of the instant invention concern:

a. The provision of a novel hot box detection method and apparatus wherein overheated journal boxes are detected with great accuracy and with high reliability;

b. The provision of a hot box detection method and apparatus wherein overheated journal boxes are detected in a fashion wherein spurious heat source signals are ignored;

c. The provision of a novel hot box detection method and apparatus wherein the presence of a hot box condition at a journal bearing is accurately detected in spite of variations in rolling stock, electrical interferences, noise on transmission media, environmental conditions and the like;

d. The provision of a novel hot box detection method and apparatus wherein an alarm signal is produced nearly independent of all noncritical variables;

e. The provision of a novel hot box detection method and apparatus which, in a completely automatic fashion, detects the existence of an alarm condition at a passing car and notifies the train crew of such condition;

f. The provision of a novel hot box detection method and apparatus wherein the defective car is simply and reliably identified to the train crew;

g. The provision of a novel hot box detection method and apparatus wherein once an alarm condition is indicated, the train can be stopped in the shortest possible time;

h. The provision of a novel hot box detection method and apparatus wherein the defective car location is automatically signified; and, i. The provision of a novel hot box detection method and apparatus which internally monitors its own operation so as to give an indication of its operability to the passing train crew.

These objects as well as other objects which will become apparent as the description proceeds, are implemented by the novel invention which, from a broad standpoint, will be seen to comprise both a novel method and apparatus for monitoring overheated journal bearings, i.e., hot boxes, on a passing railroad train. In accordance with the novel inventive concepts, the temperatures of a plurality of journal bearings or boxes disposed on a passing car are monitored by a heat sensing device. An average temperature value for each side of the passing car is derived from these monitored temperatures. Significantly, comparisons are then effected between the temperatures of the individual journal boxes disposed on a given side of a car and the derived average temperature value for the given side, and any deviations either above or below predetermined limits are utilized to signify the presence of an alarm condition.

This technique in and of itself affords a significant advantage over the prior art since, by comparing the temperatures of the individual journal boxes on a given side of a car with the average temperature value of a plurality or all of the journal boxes on the same car side, highly reliable alarm sensing criteria are achieved in a facile manner. Specifically, car side dependent variable such as sun heating, load heating, heat loss due to winds, and changes in the relative position between the journal boxes and the external detector are essentially eliminated. Thus, the monitoring output is very nearly independent of all variable factors which might produce an erroneous alarm signal.

This technique is effected in an economical and reliable fashion at the track site itself through digital techniques and in an automatic manner. Accordingly, human interpretation of the heat signals is eliminated and an alarm condition signal is automatically generated to signify the occurrence of a defect condition within a journal bearing.

The novel invention further includes a means for correlating the presence of an alarm condition with a particular car and wheel, this correlation also being effected in a completely automatic fashion. In this respect, the novel invention incorporates means which serves to detect either the center or the end of a passing car and to generate a "car" signal in response thereto. This signal is utilized to effect the various transfer operations of the individual heat signals derived from the passing journal boxes of the car in a fashion to be discussed in more detail hereinbelow.

In the preferred inventive embodiment, the hot box invention, i.e., the presence of an alarm condition and the particular car, wheel and side at which the alarm condition has occurred, is then forwarded or enunciated to the train crew and preferably to the engineer of the train such that the train crew can readily correct the defective conditions and keep the downtime of the train at a minimum.

Since the novel hot box detection method and apparatus of the instant invention is contemplated to be wholly automatic, further means are provided by which the train crew is given information as to the actual operability of the detection system. Specifically, and again in the preferred inventive embodiment thereof, the operational reliability of the detector system itself is gauged by monitoring the average car side signals that have been derived against some predetermined limits. If the average car side signals fall within the predetermined limits, then this can be deemed an accurate indication of reliability of the detection system. Furthermore, in the event that synchronization between the car detector and the individual journal heat signals is lost, the novel inventive system is contemplated to automatically switch over to a less accurate prior art "axle comparison" technique wherein, although the alarm criteria is degraded, the operability of the system as a whole is maintained.

BRIEF DESCRIPTION OF THE DRAWINGS

The invention itself will be better understood and further features and advantages thereof will become apparent from the following detailed description of a preferred inventive embodiment, such description making reference to the annexed drawings, wherein:

FIG. 1 is a functional block diagram schematically representing the novel hot box detection system of the instant invention;

FIG. 2 is a schematic block diagram illustrative of the remote readout device utilized with the novel hot box detection system of the instant invention;

FIGS. 3a, 3b and 3c are a schematic representation of a digital technique utilized to detect individual cars of the passing train so as to correlate individual wheel signals with particular cars;

DETAILED DESCRIPTION OF A PREFERRED INVENTIVE EMBODIMENT

Figure 4:
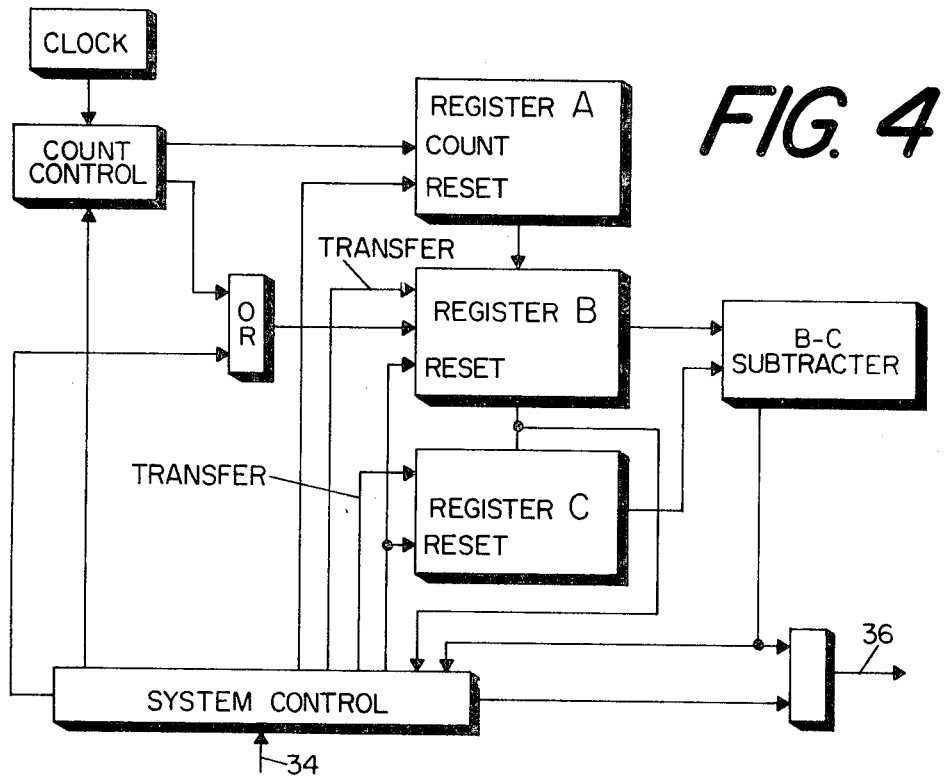
FIG. 4 is a functional block diagram of a novel car detector apparatus utilized with the overall hot box detection system of the invention.
Figure 4A:
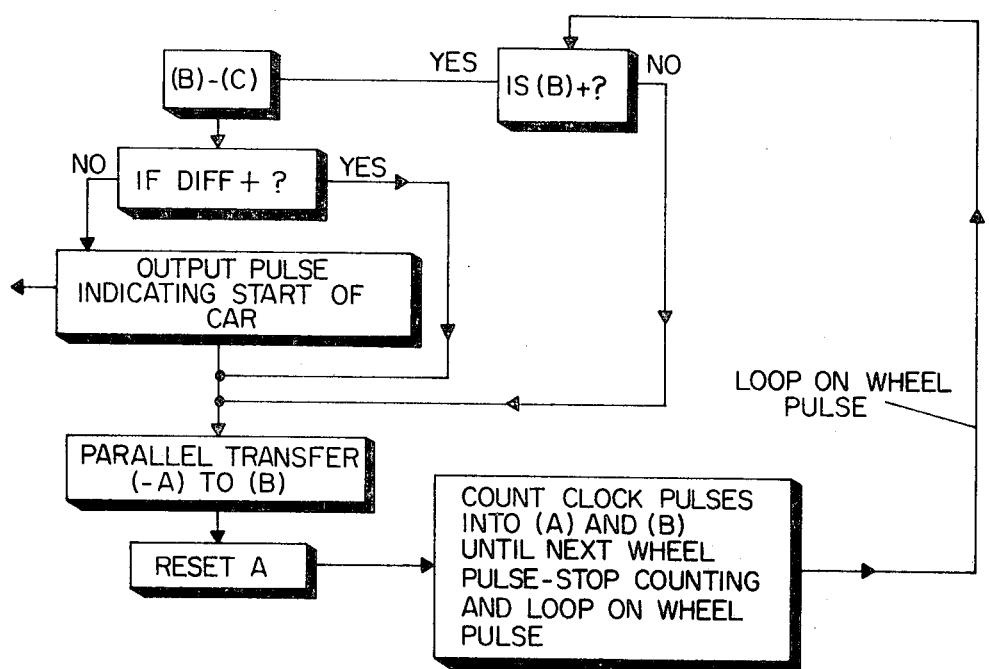
FIG. 4a is a flow diagram of how the car detector logic operates.

Reiterating for just a moment, the novel inventive technique has been briefly described as comprising a technique wherein an average temperature signal is derived from a plurality of journal boxes disposed on one side of each car, and the signal individual to each journal box of that car side is compared to the average signal value. This technique in and of itself represents a totally new approach in the art of automatic evaluation and, as has been alleged, serves to effectively eliminate all noncritical side dependent variables from the actual heat monitoring of the passing journal boxes. Now, it should be understood that a hot box sensor or detector will produce a heat signal for each wheel, the value of such signal depending upon the number of parameters.

For example, the output of the sensors of the novel detector system can be shown to depend upon (1) the heat absorption from external sources such as the sun $f(a)$; (2) a heating due to motion or speed of the car $f(v)$; (3) a heating due to loading of the car $f(L)$; (4) the bearing heating factor $f_b$ which increases when a hot box develops; (5) the heat loss into the side frame of the truck $f(h)$; (6) the heat loss due to winds unrelated to train motion $f(W)$; (7) the heat loss due to drive wind $f(V_w)$; (8) the changes in bearing position caused by changes in wheel size $f(P)$; (9) the changes due to view or line of sight adjustment of the scanner $f(A)$; (10) the changes due to attenuation of the optical path due to dust, dirt, snow, etc., $f(g)$; (11) the changes due to the gain of the detector unit $f(G)$; (12) and the changes due to variations in the detector frequency response $f(S)$.

Now, it should be understood that the heat absorption from external sources $f(a)$, the heating due to loading $f(L)$, the heating loss due to winds unrelated to train motion, such as crosswinds, $f(W)$, the changes due to the adjustment and line of sight of the scanner $f(A)$, and the changes due to variations in the detector frequency response are all variables which primarily depend upon and are functionally related to one or the other of the two car sides. Thus, it is desirable to derive an average signal from a plurality of wheels on one side of each car, and preferably from all wheels at one side of each car, and to compare each individual wheel of that car side in a suitable manner to the derived average signal value. In this fashion, a comparison can be utilized, such as a ratio comparison, for obtaining a result which is nearly independent of all variables and thus the detector output would, in effect, be a reliable criterium of the presence of an alarm condition.

Expressed mathematically, it can be seen that the ratio output of the detecting apparatus equals:

$$(1) \quad \frac{f(a) + (f(v) + f(L)) f_1(b) - [f(h) + f(W) + f(V_w)] f(P)}{\frac{1}{n}[n \cdot f(a) + (f(v) + f(L))[f_1(b) + \ldots + f_n(b)] - n[f(h) + f(W) + f(V_w)] f(P)}$$

assuming that only $f(b)$ varies significantly between normal and hot bearings.

Now, this expression reduces to:

$$(2) \quad = \frac{f_1(b) \cdot n}{f_1(b) + \ldots + f_n(b)}$$

making the justified assumption that the quantity $$f(a)[f(h) + f(W) + f(V_w)] f(P)$$

is small compared to the quantity $1/n[f(v)+f(L)](f_1(b)+af_n(b))$ The detector output will be 1 if the one wheel signal $f_1(b)$ equals the average wheel signal. In the previous equations, $n =$ number of axles of one car and $f_1(b) =$ factor $f_b$ of the first wheel of one car side.

An examination of equation (1) verifies that each heat signal depends on variables which are unique for that rain side and that sensor.

Comparing one such heat signal to the average of one car side and dividing by the average produces equation (2), after standard mathematical manipulations. It is significant that all the side dependent factors $f(P)$, $f(A)$, $f(g)$, $f(G)$ and $f(S)$ vanished from the equation. This is the advantage of taking a ratio although other comparison techniques can also be used.

Equation (2) now is the mathematical expression of the alarm criterium of the novel inventive technique when comparing one heat signal (of bearing A1) to the average of that train side.

Expressed in a different fashion, the novel technique of the instant invention is such that the temperature $t_x$ of each of a plurality $n$ of journal boxes disposed on one side of a car is monitored to obtain a plurality of separate quantities $t_x$ ($x=1 ,\ldots n$). Then, the quantity $$A = \frac{1}{n} \sum_{x=1}^{x=n} t_x$$

is obtained. If a ratio comparison is desired, separate quantities are then obtained, $B_x = t_x/A$ where ($x=1,\ldots n$) and, each quantity $B_x$ is then compared with a reference or limit quantity and an alarm is selectively generated in dependence upon this comparison. An alternative method of comparison, where division is expensive or slow, is to determine the difference between each wheel temperature and the average temperature of all wheels (or given plurality of wheels) on the same side of the same car. This temperature difference may be represented by the following expression:

$$\Delta t_n = t_n - \frac{1}{n} \sum_{x=1}^{x=n} t_x$$

From an apparatus standpoint, this technique is effected by providing a sensor means which is responsive to the temperature of the journal boxes on the cars of a passing train. The sensor means is contemplated to feed into an evaluator means which is coupled thereto for producing an output which would be representative of the comparison made between the temperature of a journal box on a given side of a car and the average temperature value of all journal boxes disposed on the given car side, such comparison preferably being of the ratio type although other comparison techniques are also suitable. Finally, comparison means would be provided for comparing the evaluator output with a reference or limit value and for selectively producing an alarm indication therefrom.

Referring specifically now to FIG. 1 of the drawings, the actual track site equipment contemplated to be utilized with the novel inventive system is depicted. A typical railroad track is designated by reference numeral 10 and, to either side of the railroad track, sensing units 12 are disposed. These sensing units are contemplated to comprise infrared heat detectors having a sight axis intersecting the journal boxes of a passing train.

Now, as each journal box of the passing train goes by the associated sensor 12 disposed to either the right or the left of the track 10 at desired locations to properly view the passing journal as indicated by the wheel sensor indicating wheel passage, sensors 12 respectively serve to generate an analog voltage signal on lines 14 and 16, the value of this signal being proportional to the magnitude of the heat actually sensed. At the same time, as each axle or wheel goes by, a pulse is produced by a wheel sensor 18 on line 20. Heat sensors 12 and wheel sensor 18 form a conventional hot box detector unit generally designated 22 such as the General Electric Hot Box Detector Model 3S7516HB.

The analog voltage signals on lines 14 and 16 proportional to the heat of the journal boxes to either side of a single passing axle form the input to a heat signal digitizer 23 which serves to convert the analog voltage signals from each of the sensors 12 into digital signals preferably of a binary nature. The analog-to-digital conversion within the heat signal digitizer 23 takes place in synchronism with the wheel pulse generated on line 20 and input as a gating signal into the heat signal digitizer 23 via line 24. In the preferred inventive embodiment, the heat signal digitizer 23 comprises a conventional gated analog-to-digital converter and incorporates two parallel channels for the right and left heat signals generated on lines 14 and 16, respectively, by the heat sensors 12.

As each axle or wheel of the car passes by the hot box detector 22, the respective analog voltage signals generated and converted into digital signals are then serially discharged into a holding storage means 30 along lines 26 and 28. Again, in the preferred inventive embodiment, holding storage means 30 preferably comprises two parallel though separate storage devices such as shift registers so that the heat signal from the right side of the car and the heat signal from the left side of the car respectively carried along lines 26 and 28 are maintained separately. If desired, however, and as should be apparent to those skilled in the art, a single output channel could be provided and the right and left heat signals separated on a serial time sharing basis. Holding storage means 30 thus, at any one time, will contain a plurality of digital signals representative of the journal box heat of a number of axles that have passed by the hot box detector 22.

In accordance with the novel invention, the digital heat signals stored in the holding storage means 30 are correlated with a particular car that has passed by the heat detector 22. This correlation must take place since, as described at the outset of the specification, the novel inventive method and apparatus essentially serves to analyze the heat signals generated by each respective car and furthermore, serves to separately analyze the heat signals generated by the journal boxes disposed on each side of the respective car. Thus, a car detector means 32 is provided into which the wheel or axle pulses from wheel counter 18 are fed via lines 20 and 34. The output of the car detector means 32 is contemplated to comprise a gating pulse on line 36 representative of the passing of a single car, this gating pulse serving as a transfer signal for the holding storage means 30. In this fashion, a plurality of digital heat signals equal to the number of journal boxes disposed on a respective car are stored in the holding storage means 30 and, upon the presence of the transfer signal from car detector means 32 via line 36, the plurality of stored signals are then subsequently analyzed in a fashion to be described hereinbelow. The process serves to repeat itself as will be apparent on a car-by-car basis.

The car detector means 32 and particularly its functional operation in and of itself constitutes a novel and advantageous approach in the art. It is for this reason that it would be useful at this point to digress from the description of the overall system and to describe in more detail the structure and operation of the car detector means 32. In this respect, attention is directed to FIG. 3 of the drawings from which the novel operation of the car detector means 32 can be understood.

In FIG. 3, a plurality of railroad cars are designated by reference numerals 38, 40 and 42, respectively. As shown, each car is seen to include two trucks, cars 38 and 42 utilizing two-axle trucks 44 and 44', and 46 and 46', respectively. On the other hand, car 40 is seen to utilize three-axle trucks 48 and 48'. Thus, cars 38 and 42 each include four wheels to a side while car 40 includes six wheels to a side. Now, $D_1$ depicts the distance between axles of the same truck on each car, $D_2$ depicts the distance between the last wheel of the first truck and the first wheel of the second truck on each car, and, $D_3$ depicts the distance between the last wheel of one car and the first wheel of the next adjacent car. For a given combination of cars and adjacent distances, it will be seen that the following relationship is true: $D_1$ is less than $D_3$ is less than $D_2$. If the train is running at substantially constant speed, the elapsed times in covering these respective distances as indicated by identical subscripts will form the following inequality:

$$T_1 < T_3 < T_2$$

In the following discussion using distances it should be understood that at substantially constant speed, the respective time measurement values may be used.

These various distances are depicted on chart 3a as upwardly directed lines 50 through 74, the magnitude or length of these lines being representative of the various distances $D_1$, $D_2$, $D_3$. Thus, line 50, for example, illustratively depicts the value of distance $D_1$ between the axles of truck 44 of car 38.

Referring now to chart 3b, a plurality of schematically represented lines 76 through 98 are illustrated. Each of these lines are representative of the mathematical difference between adjacent distances as depicted by the lines on chart 3a. Thus, for example, line 76 on chart 3b has a value representative of the difference between line 52 and line 50 on the chart 3a, or the value of line 52 minus the value of line 50. Similarly, line 78 on chart 3b has a value, negative in this case, representative of the value of line 54 minus the value of line 52 in chart 3a. Similarly, line 86 in chart 3b represents the value of line 62 from which the value of line 60 has been subtracted on chart 3a.

Going one step further and referring now specifically to chart 3c, the lines thereon depict the values obtained by taking the differences between only the positive or upwardly directed lines 76, 80, 86, 92, and 96 of chart 3b. Thus, the value of line 100 which extends downwardly and thus, by convention, is negative, represents the value of line 80 from which the value of line 76 in chart 3b has been subtracted. Line 102 represents the value of line 86 from which the value of line 80 has been subtracted. Line 104 represents the value of line 92 from which the value of line 86 has been subtracted. Finally, line 106 represents the value of line 96 from which the value of line 92 has been subtracted.

Now, as should be apparent, it will be noted that all positive values, i.e., 102 and 106, obtained on chart 3c, represent the first wheel of the last truck of each car. Similarly, all negative values 100 and 104 of chart 3c represent the first wheel of the first truck on each car. Accordingly, by merely taking the negative values, for example, one line is obtained for each car and this line is representative of the output generated by the car detector means 32. Each negative value signal is then used to initiate computation of data accumulated during passage of the previous car. The positive value pulses are ignored.

To summarize the above concept, the distances between the various wheels of the passing cars are plotted and the differences between a given distance and the preceding one are taken so as to obtain either positive, negative or zero values in synchronism with the measurement of the given distance. Now, only the positive values (i.e., 76, 80, 84, 86 of FIG. 3b) thus obtained are next considered. Specifically, the differences between each positive value and the preceding value are taken and, from such differences, positive and negative values (see FIG. 3c) are obtained. Importantly, however, only a single positive and a single negative value are obtained and at a specified location on the car. Thus, by monitoring negative values, for example, one signal will be produced upon the passage of each car of the train, this signal being utilized as a transfer or gating signal, as discussed. As a check to insure proper operation of the wheel detector, i.e., to recognize missed wheels, the output of the car detecting means 32 is monitored to assure that only even numbers of axles per car and cars with at least 4 axles are recognized.

Car detector monitor, which may comprise a counter, responds to the signals, i.e., wheel pulses, over 20 to count up the number of axles sensed at the indication of the end of car signal on 36, the number stored in the counter indicates whether the number of axles counted is odd or exceeds a given number such as eight axles. If such a fault indication is produced, a signal is transmitted over 4 to holding storage circuit 30 to block transmission of signals from 30 to 130 and 136 and to apply signals to 156 to actuate comparator 156 to perform the alternate temperature algorithm to be described.

The car detector is shown in more detail in FIG. 4. It will be seen that this is composed of three registers A, B and C, a clock and a count control circuit together with a system control circuit. An additional subtracter B–C is shown with an output connected through an output gate to be described later. The wheel signal 34 feeds into the signal control box as indicated. Before the first wheel signal is received, the three registers A, B and C are reset to zero. When the first wheel signal is received, the system control through the count control starts counting clock pulses into the register A. At the same time clock pulses are counted into the register B. When the second wheel signal is received, the counting into the A and B registers is temporarily halted and the following procedure takes place. The contents of the B register are examined to determined if it is positive. If it is positive, the contents of the C register are subtracted from the contents of the B register by the subtracter labeled B–C. Since zero was initially loaded into the C register, the results of such a subtraction must be positive. Under this condition, there will be no output to the output gate leading to line 36. Since the contents remaining in the B register were positive, the results will be transferred to the C register. The number in the B register will now be erased and the negative complement of the quantity in the A register will be transferred to the B register. The count control circuit is now implemented and clock pulses are counted in the A register until the next wheel signal. During this time, both the A and the B registers are counted up. On the next wheel signal, the count procedure is stopped and the following procedure is started.

First the contents of the B register are examined to determine whether the result is negative or positive. If it is negative, the negative of the number in the A register is transferred to the B register and the count continues without altering the C register. If, however, the B register indicates a positive value, the B–C subtracter must perform the indicated B–C subtraction to determine the polarity of the result. Again, if the result is positive, there is no output but if it is negative, an indication is transmitted to indicate the beginning of a car overload 36. At the end of this time, the contents of the B register are transferred to the C register and the negative of the A register is transferred to the B register and the count is resumed for the next integral. This procedure is repeated for each subsequent integral between successive wheel signals.

Referring again now to the overall system of FIG. 1, it has been seen that the output from the car detector means 32 on line 36 comprises one pulse, for example such as 100 or 104 of FIG. 3c, per each passing car and, as explained above, this pulse serves as a transfer or gating pulse for the digital heat signals of that particular car which have been stored in the holding storage means 30.

Now, all of the individual and digitized heat signals for one side, such as the right side, of a given car stored in the holding storage means 30 are output along line 128 into a side averager means 130 wherein an average signal value for the individual heat signals of the car side is obtained and is output on line 132. Each of the individual heat signals for this particular side are then output once again from the holding storage means 30 along line 136. One by one, the individual heat signals on line 136 are compared with the average side signal value on line 132 in a signal comparator means 138. Any deviation of an individual heat signal from the average heat signal for that side that does not fall within predetermined, preset limits functionally designated by block 140, causes an output to occur on line 142 into an alarm output means 144. At the same time the output of car counter 42, car side monitor 43 and axle counter 44 are communicated to alarm output 144 to indicate the location of the hot box. At the same time, the actual average side value from the side averager means 130 is input via line 146 into an average comparator means 148. If the value of at least one right-side average signal and one left-side average signal available from 130 exceeds a predetermined limit as set, no heat detector malfunction signal will be transmitted over lead 163 to sound an alarm by 144 at the end of the train as indicated by the termination of wheel signals as indicated on line 34. If, however, either side fails to produce such a signal, a malfunction indication will be given. Such malfunctions as would typically affect the average comparison value are missing heat or wheel signals, system gain, and the like. As discussed above, the ability of the novel system to monitor its own operation in this fashion assures confidence in the veracity of its alarm indication, as a "checking" alarm output would otherwise occur.

After the heat signals from the right side of the individual passing car have been analyzed in this fashion, all heat signals stored in the holding storage means 30 for the left side of the car are then acted upon in the same manner and the value of the average left-side signal from the side averager means 130 is also compared in the average comparator means 148 to predetermined limits 150 to determine operability of the detecting device. Subsequently, a further set of digitized heat signals would be dumped from the heat signal digitizer means 23 into the holding storage means 30, this set of heat signals being those obtained from the next succeeding passing car. As will be recognized, the signal comparator means 138, the side averager means 130 and the average comparator means 148 may comprise conventional digital logic components.

So as to further increase the operational reliability of the novel hot box detector system, provisions are made for obtaining an alarm output signal in the event that, through malfunction, the synchronizing and transfer signal from the car detector means 32 does not occur. In this respect, an auxiliary axle comparator means 156 is "redundantly" provided, this comparator means 156 being in accordance with any typical prior art construction whereby the difference or ratio of two successive digital signals are compared. Specifically, in the event of a malfunction of car detector means 32, digital heat signals representative of the temperature of the journal boxes on both the right and the left side of the same axle are successively output from the holding storage means 30 into the auxiliary axle comparator means 156 via line 158 wherein the ratio or difference of the signals is taken and wherein an alarm condition output is transferred via line 160 into the alarm output means 144 in the event of deviations of the comparison result from any preset limits. In this sense, then, the "redundant" portion of the novel hot box detector system of the instant invention serves to automatically switch from its preferred operation into the operation of prior art detector systems.

Many different modes of transferring this "alarm" information to the train crew can be utilized within the overall inventive concepts expressed herein. For example, this information can be transmitted over conventional lines to a train dispatcher's office, the train dispatcher reading the information and operating certain trackside signals visually observed by the engineer of the train at some distance down the track.

A particular form of transferring alarm indicia to the train crew is preferred, however, and is described hereinbelow. The alarm output means 144 would serve to store the input alarm information and, when the train has passed by the track site location of hot box detector 22, would serve to transmit a sequential coded radio message over a schematically indicated transmission path 160 to a remote readout or printout means 162 actually carried on board the train, such remote readout means comprising a receiver and a display device. The sequential coded message transmitted by the alarm output means 144 is contemplated to contain the following information:

Start Code;
Total Number of Wheels;
Hot Box at Wheel No. (right or left) side, car Number: ;
Hot Box at Wheel No. (right or left) side, car Number: etc..;
Detector (in or out of) order; and Code.

This sequential code is contemplated to be transmitted over and over again such that its accuracy can be repeatedly verified on board the train. The on-board display included within the remote readout means 162 would, of course, be reset after an alarm condition has been corrected.

In the event of malfunction of the car detector means 32, information as to the car number at which an alarm has occurred cannot be transmitted to the remote readout means 162. Rather, the output of the auxiliary axle comparator means 156 and thus the transmitted output of the alarm output means 144 would merely give the axle number from the front of the train, for example, at which an alarm condition has occurred. With only this information, the train crew would have to manually count axles to the defective location.

As should now be apparent, the objects initially set forth at the outset of this specification have been successfully achieved.

What is claimed as new and desired to be secured by Letters Patent of the United States is:

1. A method for detecting hot journal boxes of cars of a train, said method comprising the steps of:
serially monitoring the temperatures of journal boxes disposed on one side of a passing car with a common sensor to provide respective monitored temperature signals;
deriving a respective reference temperature signal for said side of each car from a selected plurality of said monitored temperature signals associated with said side of each car; and comparing selected ones of said monitored temperature signals with the derived reference temperature signals for the side and the car associated with said selected ones of said monitored temperature signals respectively to provide output alarm indications of hot journal boxes.

2. A method as defined in claim 1, further including the step of correlating each output alarm indication with an individual car.

3. A method as defined in claim 2, wherein each output alarm indication is correlated with a specific journal box on an individual car.

4. A method as defined in claim 1, wherein said means for deriving comprises means for deriving respective reference temperature signals having values which are a function of the average temperature value of said selected plurality of monitored temperatures, and wherein each said monitored temperature is sequentially compared with said derived reference temperature signals to provide individual output alarm indications.

5. A method as defined in claim 4, comprising means for providing an output alarm indication in response to a comparison of the ratio of each said monitored temperature to said derived reference temperature signals.

6. A method as defined in claim 1, where the temperatures of journal boxes disposed on both sides of a car are monitored, and wherein a separate average temperature value is derived from said selected plurality monitored temperatures on each respective car side; said monitored temperatures on each respective car side being compared with the respective separate average temperature value to provide said output alarm indication.

7. A method as defined in claim 6, wherein said monitored temperatures on one car side are first compared with the respective separate average temperature value, and thereafter, said monitored temperatures on the other car side are then compared with the other respective separate average temperature value.

8. A method for detecting hot journal boxes disposed on a plurality of cars, said method comprising the steps of:
a. serially monitoring the temperature $t_x$ of each of a plurality $n$ of journal boxes disposed on one side of a given car to obtain separate, individual temperature quantities $t_x$, ($x=1,n$) where $n =$ a desired plural number of journal boxes on said one given car side;
b. deriving the quantity $A$ where $$A = \frac{1}{n} \sum_{x=1}^{x=n} t_x$$

c. obtaining the separate quantities $B_x$ where $B_x = t_x/A$, and where $x=1, ...n$; and,
d. comparing each quantity $B_x$ with a reference quantity and selectively generating an alarm in dependence on such comparison.

9. An apparatus for detecting hot journal boxes of the cars of a train, said apparatus comprising:
common detector means for generating signals representative of the temperature of journal boxes on a given side of the cars of a train; and
evaluator means coupled to said detector means for producing an alarm output representative of a deviation beyond predetermined limits of the temperature of a journal box on a given side of a car with respect to the average temperature value of a plurality of journal boxes disposed on said given car side.

10. An apparatus as defined in claim 9, further including means associated with said evaluator means for correlating said alarm output with a particular car.

11. An apparatus as defined in claim 10, further including means for generating a checking output representative of a system malfunction.

12. An apparatus as defined in claim 10, wherein said evaluator means includes side averager means for generating a signal representative of the average of a plurality of temperature signals generated by said detector means from journal boxes on one side of a car; and signal comparator means for sequentially comparing each of said plurality of temperature signals with said average signal.

13. An apparatus as defined in claim 12, wherein said evaluator means further includes an average comparator means for comparing said average signal with a predetermined reference and for generating an output as a function of said comparison, said average comparator means defining means for generating a checking output representative of a system malfunction.

14. An apparatus as defined in claim 13, wherein said means for correlating comprises car detector means for generating a signal representative of the passage of a car.

15. An apparatus as defined in claim 10, further including output means for transmitting said alarm indications and associated car correlations to a remote location.

16. An apparatus as defined in claim 15, wherein said remote location comprises the engine of said train.

17. An apparatus as defined in claim 10, wherein said output means transmits only after the last car of said train has passed said detector means.

18. A hot box detector system comprising:
sensing means for serially sensing the temperature of journal boxes on one side of the cars of a passing train;
means for separately evaluating the sensed temperatures of journal boxes on said side of each car to determine the presence of hot boxes, said means for evaluating comprising means for deriving a respective reference temperature for said side of each car from a selected plurality of sensed temperatures associated with said side of each car which is a function of the values of said last-named sensed temperatures, and means for comparing the sensed temperature values of the journal boxes associated with each car with the derived reference temperature associated with such car to generate an alarm output indication representative of a hot box and of the car side associated therewith; and
means for transmitting said alarm indication to the operator of the train after the last car has passed by said sensing means. respective output 19. A system as defined in 18, wherein said means for transmitting repetitively transmits said alarm indication.

20. A hot box detector comprising separate means for serially sensing the temperature of journal boxes located on each side of the cars of a passing train to provide temperature signals;
means responsive to a selected plurality of the temperature signals associated with one side of one car of said train to provide a reference signal having a value which is a function of the values of said temperature signals,
means for comparing selected ones of the temperature signals associated with said one side of said one car with said reference signal to provide a respectiveoutput signal for each of said selected ones of the temperature signals, and
means responsive to at least one of said output signals having a value different from an acceptable range of values for providing an alarm signal.

* * * * *

UNITED STATES PATENT AND TRADEMARK OFFICE
CERTIFICATE OF CORRECTION

PATENT NO. : 3,646,343
DATED : February 29, 1972
INVENTOR(S) : Paul W. Caulier and Donald W. Greene It is certified that error appears in the above-identified patent and that said Letters Patent are hereby corrected as shown below:

Column 5, line 30, equation (1) should read:

$$= \frac{f(a)+(f(v)+f(L))f1(b) - [f(h)+f(W)+f(V_W)] \, f(P)}{\frac{1}{n}[n \cdot f(a)+(f(v)+f(L))[f1(b)+...+fn(b)] - n[f(h)+f(W)+f(V_W)] \, f(P)]}$$

Column 5, line 44, equation should read:

$$f(a) - [f(h)+f(W)+f(V_W)] \, f(P)$$

Column 5, line 45, equation should read:

$$\frac{1}{n}[f(v)+f(L)] \, (f1(b)+...+fn(b)).$$

Column 5, line 51, cancel "rain" and substitute --train--.
Column 11, line 43, cancel "(x-1,n) and substitute --(x=1,...n)--.
Column 12, line 49, cancel "respective output".
Column 12, line 50, after "defined in" insert --claim--.

Signed and Sealed this

Nineteenth Day of April 1977

[SEAL]

Attest:

RUTH C. MASON
Attesting Officer

C. MARSHALL DANN
Commissioner of Patents and Trademarks